Aug. 27, 1957  F. R. BERGSETH  2,804,578
PHASE-COMPARISON DISTANCE RELAY
Filed June 26, 1953  5 Sheets-Sheet 1

INVENTOR.
FREDERICK R. BERGSETH.
BY
ATTORNEYS.

Aug. 27, 1957  F. R. BERGSETH  2,804,578
PHASE-COMPARISON DISTANCE RELAY
Filed June 26, 1953  5 Sheets-Sheet 2

VECTOR DIAGRAM OF RELAY VOLTAGES.

LOCUS IN R-X PLANE.

FAULT LOCATION IN TERMS OF ARTIFICIAL LINE SECTIONS.
(EACH SECTION IS EIGHT OHMS OR TEN MILES)

INVENTOR.
FREDERICK R. BERGSETH.
BY
*Harold T. Stowell*
ATTORNEYS.

Aug. 27, 1957 F. R. BERGSETH 2,804,578
PHASE-COMPARISON DISTANCE RELAY
Filed June 26, 1953 5 Sheets-Sheet 3
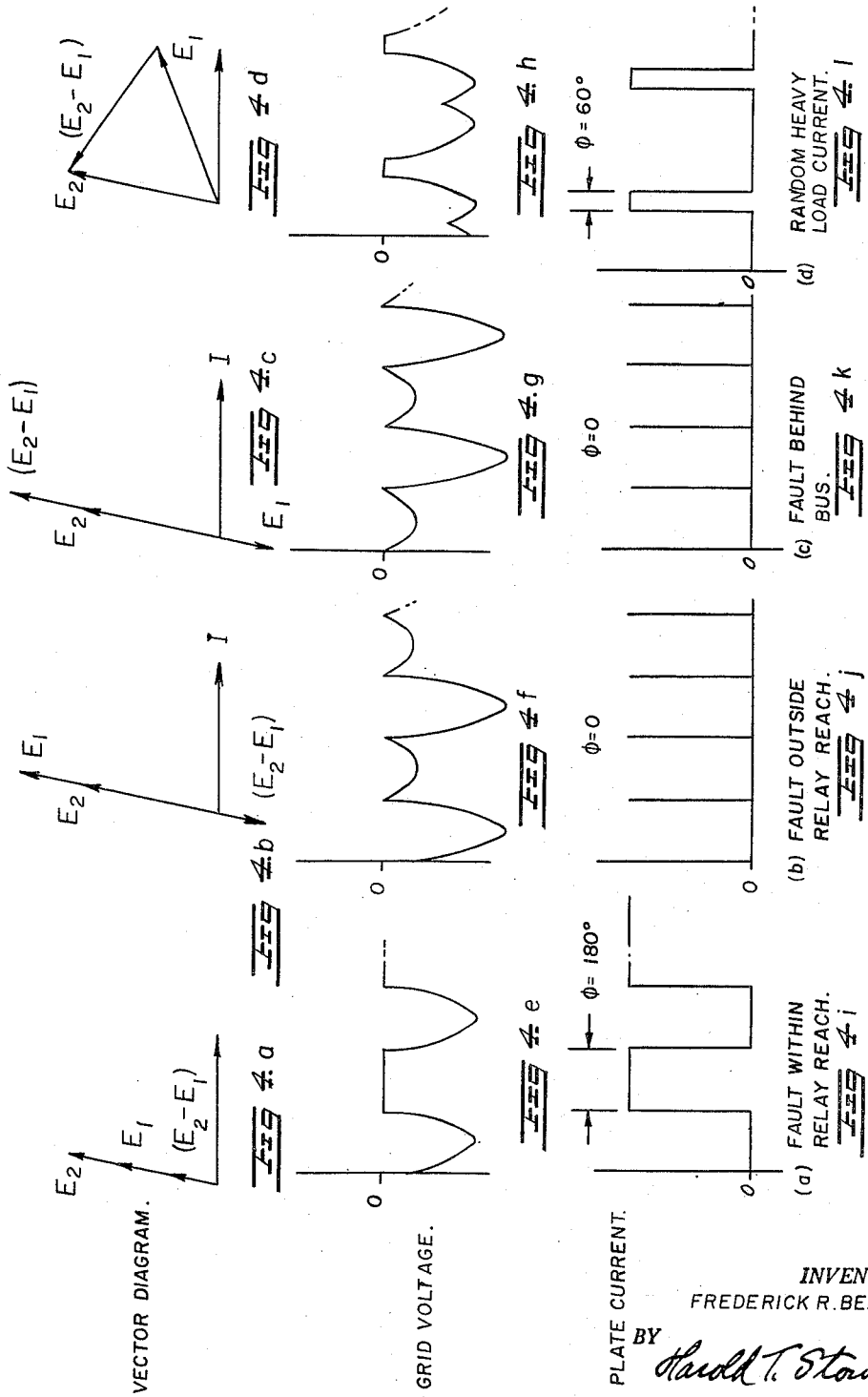
INVENTOR.
FREDERICK R. BERGSETH.
BY
ATTORNEYS.

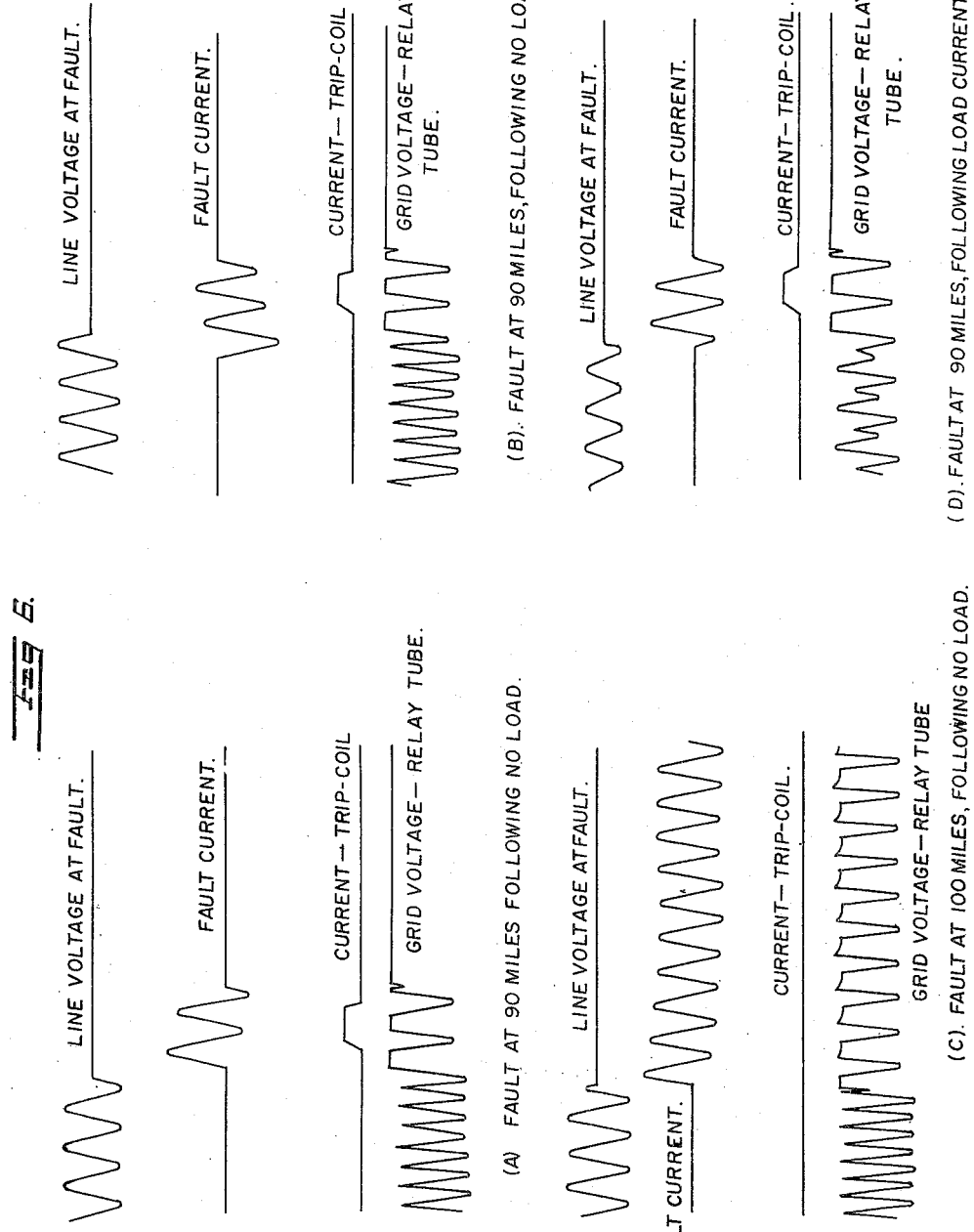

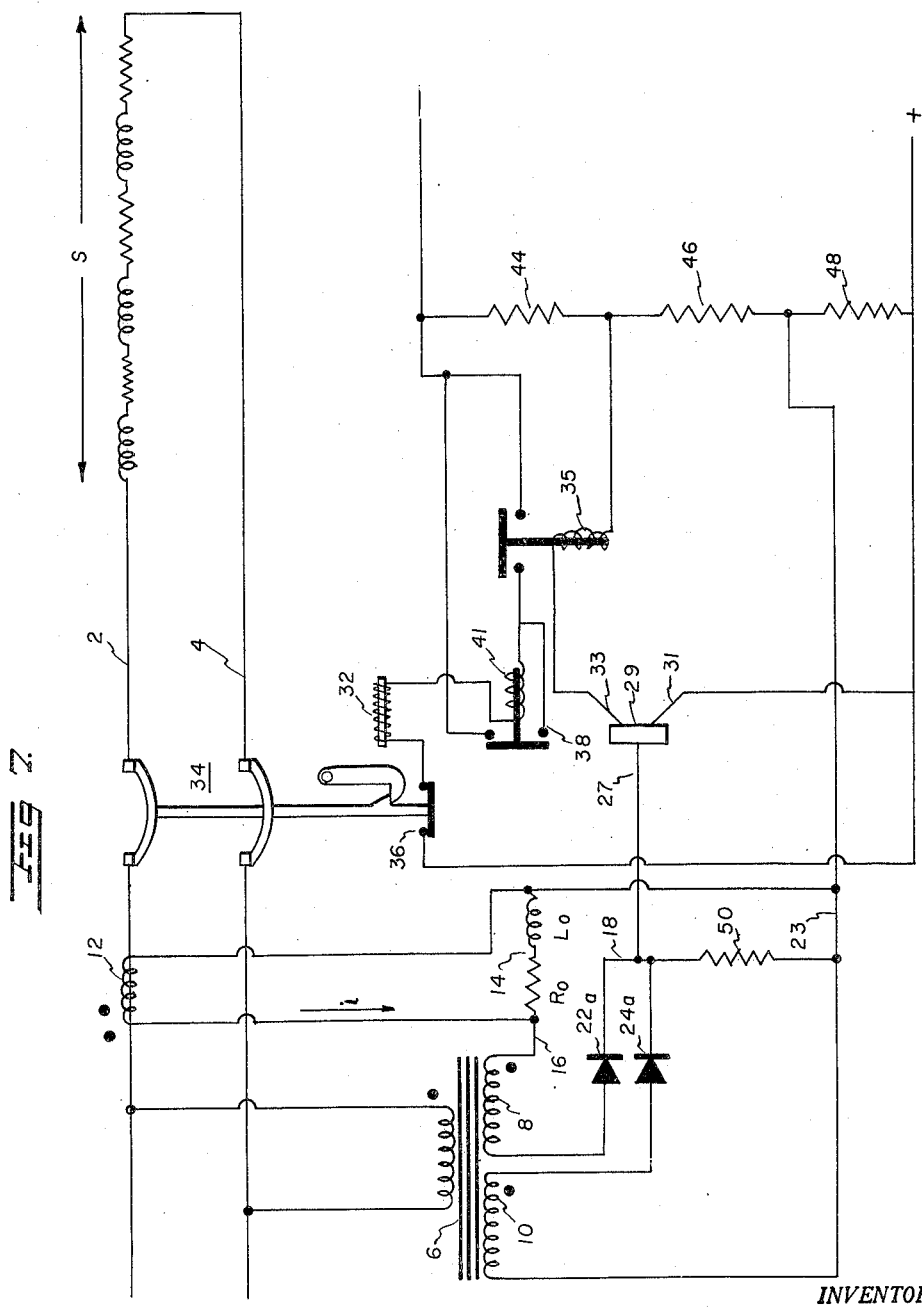

2,804,578

PHASE-COMPARISON DISTANCE RELAY

Frederick R. Bergseth, Seattle, Wash., assignor to Research Corporation, New York, N. Y., a corporation of New York Application June 26, 1953, Serial No. 364,453

5 Claims. (Cl. 317—36)

This invention relates to electronic relay arrangements for protecting power systems and more particularly to a protective arrangement which is operable in response to predetermined instantaneous voltage conditions existing during a fault on the protected power system.

Electromechanical relay systems for protecting power lines are known; these are subject to difficulties arising from inertia, friction, wear or incorrect adjustment, all of which factors also adversely affect the sensitivity of such systems. High speed electronic relays have been devised for responding to a fault in a predetermined section of power line to actuate suitable protective equipment. Such relays are known which compare a voltage component and a current component at some particular instant in the cycle, and include electronic "mho" type relays which compare voltage and current at the instant of voltage maximum and also reactance type relays which compare voltage and current at the instant of current zero. A fundamental difficulty with these relays is that since instantaneous quantities are compared, the relays are subject to error because of transients or distortions of wave shape. One successful type of electronic relay is the carrier-current phase-comparison relay in which the power frequency voltage wave out of a filter network is clipped to form a series of square pulses and the effect of higher frequency transients and wave form distortion is thereby minimized.

It is a primary object of this invention to provide an improved electronically actuated relay system which is not subject to the above disadvantages. The improved relay of the invention, like the phase-comparison carrier-current relay, clips the voltage wave and compares phase angles of quantities, thereby minimizing the effect of transients. However, it does not compare currents at opposite ends of a line section, like the phase-comparison carrier-current relay, but its operation involves a comparison of voltage and current at one end of the line, and it possesses what is known as a "mho" or "modified impedance" characteristic on the R-X diagram.

Another object of the invention is to provide an electronic line-protective relay sensitive to faults occurring within a predetermined distance on the line from the relay, but not to faults occurring further out on the line. Still another object is the provision of a relay of the above type which is not sensitive to transients and wave-form distortion. A still further object is the provision of a relay of the above type which is simple in construction and circuitry.

A further object of the invention is to provide an improved electronic distance relay or power line protection of the mho type with simple provision for changing the characteristic locus of the relay.

The specific nature of the invention, as well as other objects and advantages thereof, will clearly appear from a description of a preferred embodiment as shown in the accompanying drawings in which:

Figs. 4a–4l are diagrams showing the voltage relations for typical cases of relay operation;

Figs. 6a–6d represent oscillograms of actual operation under various conditions in order to illustrate the operation of the improved relay; and Fig. 7 is a schematic diagram similar to Fig. 1 but showing the use of a transistor instead of a vacuum tube.

Figure 1:
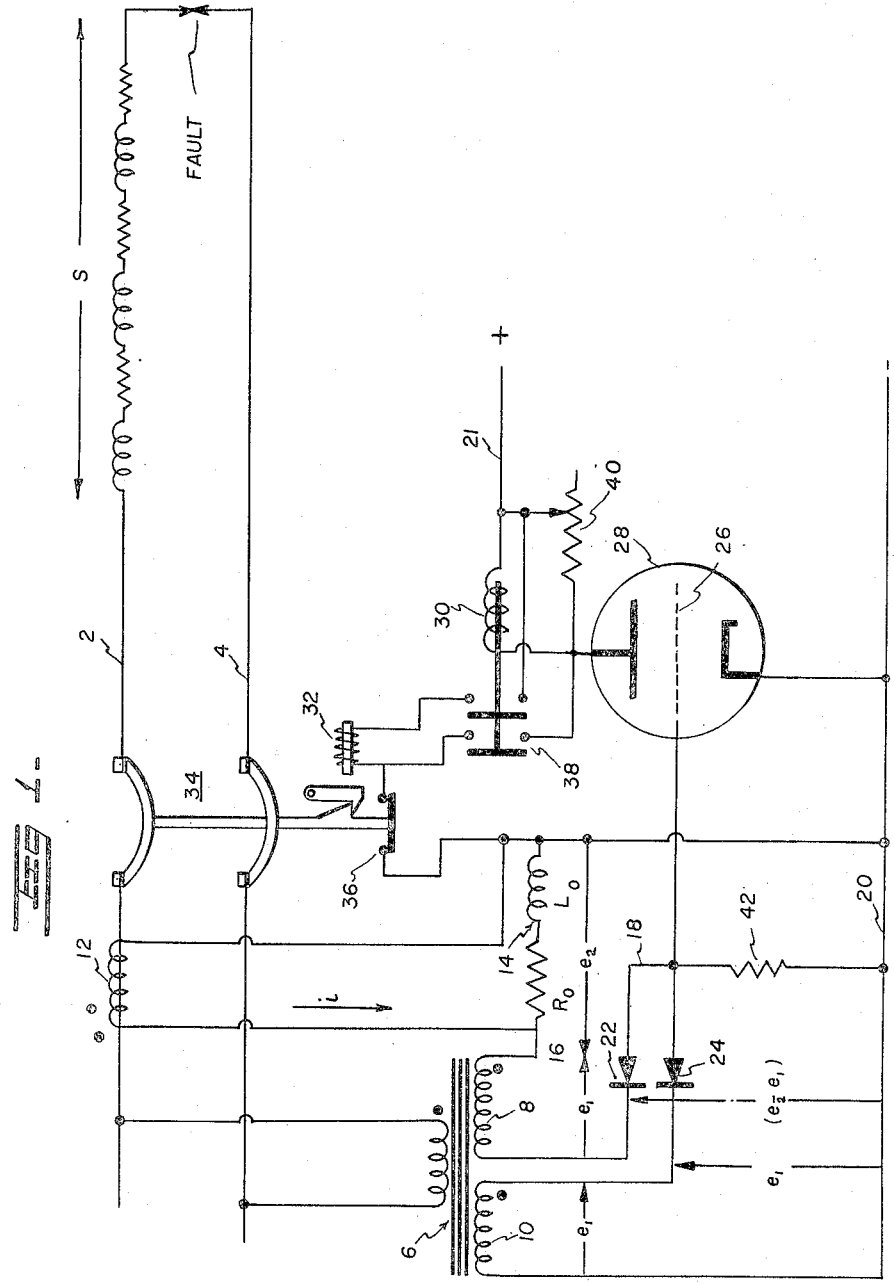
Fig. 1 is a schematic diagram illustrating a protective system employing a vacuum tube relay embodying the invention.

Referring to Fig. 1, the line to be protected is represented by reference characters 2 and 4, and is shown on a single-phase basis. Three-phase connections would, most usually, use delta voltages and delta currents in the well known connection which causes all phase faults to appear equivalent to the relay. In the following analysis the line shunt capacitance is omitted as in the usual approximation and for simplicity in explanation it is assumed that the instrument transformers all have a ratio of 1:1. Such auxiliary instrument transformers as might be needed in a practical installation for isolation and proper voltage relations are omitted in the interest of clarity.

If the line has a resistance of R ohms per mile and an inductance of L henrys per mile, then the equation may be written for a fault $s$ miles out on the line:

$$e_1 = sRi + sL\frac{di}{dt} \quad (1)$$

where $e_1$ is the the voltage at the point under consideration as picked up by transformer 6, Fig. 1, and $i$ is the current flowing in the line; also $$e_2 = R_0 i + L_0 \frac{di}{dt} \quad (2)$$

where $R_0$ and $L_0$ are arbitrarily selected values of resistance and inductance respectively, and small $e_2$ is the voltage which would be produced by the same current flowing through these values of resistance and inductance.

If $R_0$ and $L_0$ are chosen respectively equal to $s_0 R$ and $s_0 L$ then $$e_2 = s_0 R i + s_0 L \frac{di}{dt} \quad (3)$$

and, taking the difference between $e_2$ and $e_1$ $$e_2 - e_1 = (s_0 - s)Ri + (s_0 - s)L\frac{di}{dt} \quad (4)$$

$$= \frac{(s_0 - s)}{s} e_1$$

Figure 2:
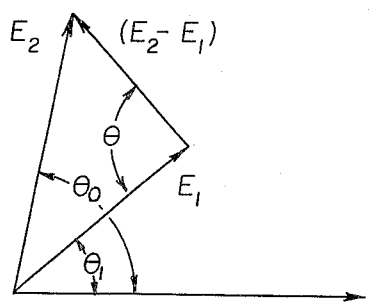
Fig. 2 is a voltage diagram.
Figure 3:
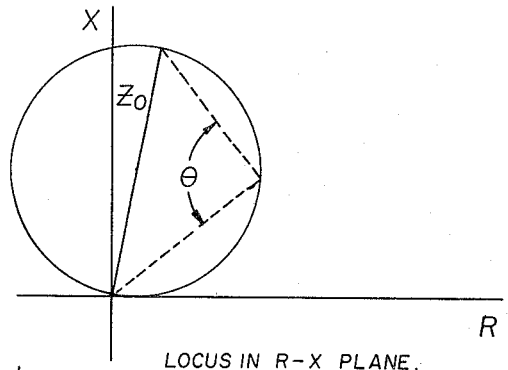
Fig. 3 is a related impedance diagram to aid in explaining the operation of the system shown in Fig. 1.

From this last expression it will be noted that if the fault is at a distance less than $s_0$ the voltage $(e_2 - e_1)$ has a polarity the same as $e_1$ while if $s$ is greater than $s_0$ the voltage $(e_2 - e_1)$ has a polarity opposite to that of $e_1$. In the case of sinusoidal voltages this might be restated to say that if the fault is closer to the bus than $s_0$, then $$\left(\frac{v}{E_2} - \frac{v}{E_1}\right)$$

is in phase with $$\frac{v}{E_1}$$

and if the fault is farther than $s_0$ then $$\left(\frac{v}{E_2} - \frac{v}{E_1}\right)$$

is 180 degrees out of phase with $$\frac{v}{E_1}$$

where $$\frac{v}{E_1}$$

are the vector or "phasor" values of the same two voltages as shown in the vector diagrams of Figs. 2–4, where the phase relationships are taken into consideration. This is the fundamental difference by which this relay distinguishes between faults inside and outside of the balance point $s_0$.

It will be noted that the present improved relay compares voltages rather than currents. This is an important practical feature with reference to an electronic or similar type relay. In Equation 3 it will be noted that in choosing the values of $L_0$ and $R_0$, if the ratios $L/R$ and $L_0/R_0$ are equal there will be no transient offset component of voltage in $e_2$. This may be demonstrated as follows:

Let the line current be represented as:

$$i = K_1 \sin(\omega t + \beta) + K_2 e^{-\frac{t}{T}}$$

Where the first term represents the steady state fault current and the second term represents the offset component, then:

$$e_2 = R_0 i + L_0 \frac{di}{dt}$$

$$= R_0 K_1 \sin(\omega t + \beta) + R_0 K_2 e^{-\frac{t}{T}} +$$

$$\omega L_0 K_1 \cos(\omega t + \beta) - \frac{L_0 K_2}{T} e^{-\frac{t}{T}}$$

but: $T = L/R$, the ratio of inductance to resistance of the transmission line and, by choice of the same ratio for $L_0/R_0$, we may write $T = L_0/R_0$ and substituting into the above equation for $e_2$, $$e_2 R_0 K_1 \sin(\omega t + \beta) + L_0 K_1 \cos(\omega t + \beta)$$

which, it will be seen, contains only the steady state component of voltage, the transient offset components having cancelled out.

An offset transient is ordinarily present in the line current of a transmission line during the period immediately following the fault, which is the very time that the relay is required to operate, whereas transient effects in the voltage are usually insignificant. The elimination of the transient offset is vital to the operation of most electronic relays and the simplicity and accuracy of the present improved relay would suffer if it were not possible to minimize the effect of the transient offset. In addition to the transient offset terms in the line current it often happens that higher frequency or harmonic terms may be present in the line voltage or current. In the case of an electronic relay of the type shown in the Warrington U. S. Patent Re. No. 23,430 the instantaneous voltage and current are compared at a particular instant in the cycle. This is characteristic of many relays of this type. A mathematical theory of these relays is based upon pure sine waves of voltage and current and large errors might result in the case of large harmonic components of significant amplitude at the instant of measurement. Since the present improved relay clips the wave forms and compares phase angles only, harmonic content would have to be exceptionally high before it would affect the plate current of the relay tubes significantly.

The circuit of Fig. 1 shows an arrangement for comparing the above voltages. Voltage transformer 6 is provided with two secondaries 8 and 10, each of which has an output voltage proportional to the line voltage $e_1$. Current transformer 12 provides a current proportional to the line current $i$, which is fed to comparison impedance 14 having a resistance $R_0$ and an impedance $L_0$ corresponding to that of $s_0$ miles of line 2, 4. In other words, impedance 14 constitutes an "imitative impedance" corresponding to the length of line which it is desired to protect. The drop in this impedance due to the current $i$ (assuming a 1:1 transformer ratio) therefore corresponds to voltage $e_2$ in Equation 2. The output of transformer secondary 8 which corresponds to voltage $e_1$ is opposed to the voltage drop across impedance 14 by means of connection 16, whereby the voltage between leads 18 and 20 corresponds to the expression $e_2 - e_1$ in Equation 4 as indicated in Fig. 1. By means of diodes 22 and 24, two voltages ($e_2 - e_1$) and $e_1$ are rectified and applied with negative polarity to the grid 26 of vacuum tube 28. The magnitude of the operating voltages is chosen such that a minimum of voltage and current on the line causes the grid of the tube to be driven far beyond cut-off in the negative direction. For a fault beyond $s_0$ the two voltages are 180° out of phase and the tube plate current is cut off at all times. For a fault inside of $s_0$ the voltages are in phase and for a period of 180° the plate circuit conducts, and auxiliary relay 30 supplied by the plate circuit then picks up to close a circuit breaker trip coil 32, to trip circuit breaker 34 and open the line 2, 4. Various circuit arrangements for this purpose will occur to those skilled in the art, one prototype which was found to operate satisfactorily being shown in Fig. 1. This utilizes the auxiliary contacts 36 commonly supplied with heavy duty circuit breakers and known commercially as "a" contacts. The contacts serve to open the trip circuit by which current is supplied to trip coil 32, which comes as part of the circuit breaker 34. As the most commonly found commercial installations are 3-phase, a 3-phase circuit breaker would generally be employed instead of the single-phase version which is shown for the sake of simplicity in illustration. Relay 30 is shown with double pole contacts 38 for connecting the negative bus 20 to the positive bus 21 through trip coil 32 and for holding relay 30 across the line even though tube 28 should cease to conduct, until circuit breaker 34 and its "a" contacts 36 have definitely opened. Variable resistor 40 is used to by-pass some of the plate current around relay 30, thereby changing the critical operating angle required to pick up the relay and in turn, therefore, changing the characteristic locus of the relay on the R-X diagram. This same function could be performed by varying the air-gap, spring tension or number of turns on the operating coil of relay 30. A grid resistor 42 is provided to maintain suitable grid bias as required by the operating characteristics of the circuit and of the tube type employed. With a 6J5 high-vacuum triode for tube 28, a value of 50,000 ohms has been found satisfactory in a prototype circuit which used also 130 volt selenium disc rectifiers or alternatively 6X5 high-vacuum rectifier tubes.

The above analysis is restricted to fault conditions. On open circuit the tube is cut off at all times because the two grid voltages are 180° out of phase. For load current conditions the two grid voltages have various relations and the tube conducts over various phase widths or operating angles. The tube conducts only during that portion of the cycle when both voltage waves are positive. The performance of the relay under these conditions is best described in terms of the locus of operation on an R-X diagram (Fig. 3). Figure 2 shows the vector diagram for the relay voltages in terms of the current $$\frac{v}{I}$$

as a reference vector. The voltages $$\frac{v}{E_1}$$

is equal to
$$\frac{vv}{IZ_0}$$

where $$\frac{v}{Z_0}$$

is the impedance of $R_o$ and $L_o$, and it appears at an angle $\theta_0$. The voltage $$\frac{v}{E_1}$$

is apt to appear at any angle $\theta_1$ depending on the magnitude and direction of real and reactive power flow. The operating angle, during which $$\left(\frac{v}{E_2} - \frac{v}{E_1}\right) \text{ and } \frac{v}{E_1}$$

are both positive and the tube is conducting, is shown as $\theta$ in the figure. This angle, the "overlap" of the two voltage waves, is necessarily always less than 180°. The auxiliary relay may be set to pick up whenever $\theta$ is greater than a certain value.

Figures 4a–4l illustrate the vector diagram, relay tube instantaneous grid voltage, and relay tube plate current for several typical cases of operation. The plate current wave is shown based upon a pure resistance load in the plate circuit. The inductance of the auxiliary relay distorts this wave form somewhat but does not alter the fundamental relationships.

If all vectors of Figure 2 are divided by the current, an impedance diagram results where $$\frac{v}{E_1} \Big/ \frac{v}{I}$$

is the apparent impedance $$\frac{v}{Z}$$

"seen" by the relay. This is shown in Figure 3. The locus of apparent impedance at which the auxiliary relay will pick up is a segment of a circle. This is so since all locations for which $\theta$ is a constant lie on a circle of which $Z_0$ is a chord subtending an angle $2\theta$ of the circle. If $\theta$ is chosen as 90° $Z_0$ becomes the diameter of the circle and the well known mho type characteristic is realized as shown in the dotted line of Figure 3.

If the auxiliary relay is set up to pick up at operating angles other than 90° the locus may be portions of other circles of which $Z_0$ is a chord.

Figure 5:
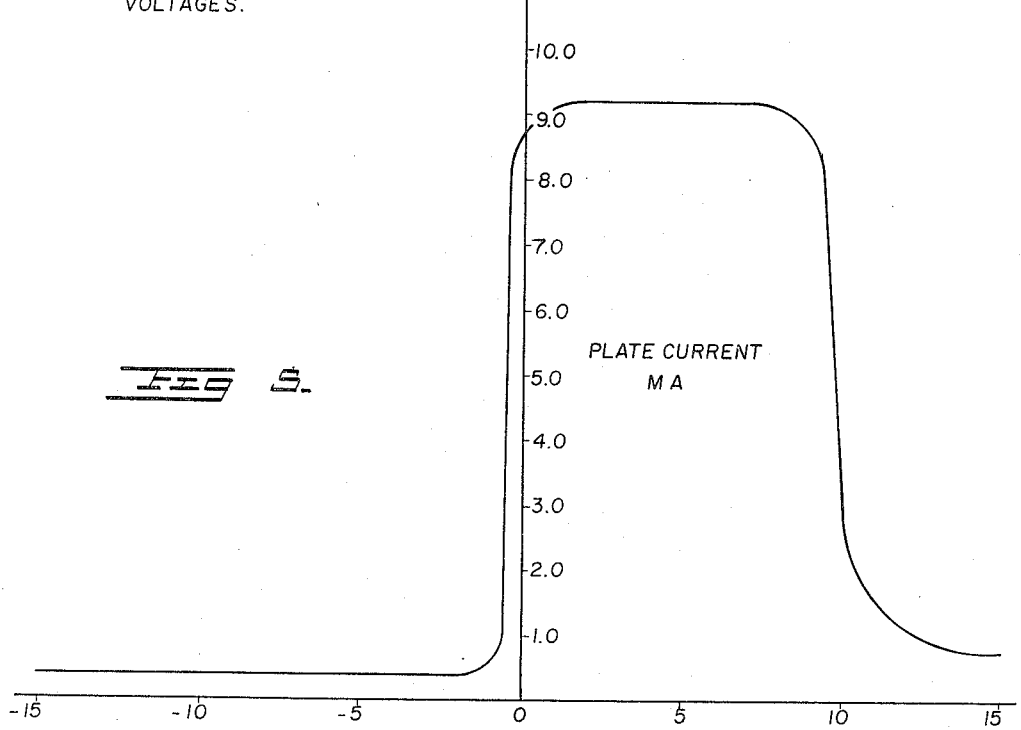
Fig. 5 is a graph showing typical operation of the relay in response to faults at various distances on an artificial line.

Fig. 5 shows the fault location in terms of artificial line sections obtained by actual tests using an artificial line. It will be noted that within reach of the relay the plate current was approximately 9 milliamperes. This corresponds to a 180° conduction angle. If the relay is set to pick up at a 90° conduction angle, this would correspond to an average current of 4.5 milliamperes. Under open-circuited and various loading conditions the average relay tube plate current was found to vary substantially as predicted from the locus of relay operation on the R-X plane.

The above tests correspond to steady state conditions. Under transient conditions, and with the relays set up to trip a circuit breaker, average relay time was found to be under 1.5 cycles. Typical oscillograms illustrating the operation of the relay are shown in Figs. 6a–6d.

The time required by this relay is a function of chance to some degree in that after initiation of the fault the relay must wait for a half cycle of proper polarity before tripping. This effect may be modified by using two tubes per phase and operating them on voltages 180° opposed in order that the time of the fault may always be propitious for one or the other tube. This would require center-tapped auxiliary instrument transformers.

The magnitude of the station service battery voltage applied to the plate of the relay tube affects the plate current with zero grid voltage on the tube and therefore affects the pick up of the auxiliary relay. For actual faults the auxiliary relay can be set to have a comfortable margin so that any normal drop of battery voltage would not affect the operation. In the example of Fig. 5 if the auxiliary relay were set to pick up at 4.5 milliamperes then the station battery voltage would have to fall almost to 50 percent of normal before the relay reach would be greatly affected.

Like many similar electromechanical devices this relay loses its directional properties for faults of zero impedance directly at the bus when voltage $E_1$ collapses to zero. By using relatively high alternating voltages into the rectifiers the relay can be made to operate correctly for very low primary voltages and this difficulty may thereby be minimized. In some circumstances it may be necessary to provide "memory action" by means of a resonant tank circuit across the $e_1$ voltage. A typical arrangement of this sort is shown in U. S. Patent Re. No. 23,430 to Warrington (col. 6, lines 1–10).

Various modifications will suggest themselves to those skilled in the art. For example, the vacuum tubes may be eliminated by using selenium diodes and transformers, since the use of selenium diodes in voltage discriminating circuits is well known. However, if the vacuum tube amplification is eliminated it should be noted that all energy to operate the auxiliary relay would be required to come from the instrument transformers, with consequent higher burdens on these elements. Since one of the attractive advantages of electronic relays in general is the possibility of reducing the burden on the instrument transformers, the particular form of relay shown above seems to be fundamentally suitable for vacuum tube applications and therefore has been described in connection with such an application.

Fig. 7 shows an arrangement generally similar to Fig. 1, but employing a transistor in place of the vacuum tube 28 of Fig. 1. This enables utilization of the well known advantages of transistors, including small size, long life, and the absence of a heater filament with its attendant power supply. Elements which are unchanged retain the same reference numerals as in Fig. 1. Note that the orientation of diodes 22a and 24a is reversed relative to diodes 22 and 24 of Fig. 1. In the transistor version shown in Fig. 7, type IN38 germanium diodes are employed, circuit voltages being reduced to bring inverse voltages within the range of the germanium diodes and transistors. Conductor 23 now serves as a common connection and is on the positive side as will be noted from its attachment point to voltage divider network 44, 46, 48, instead of serving as negative bus as the corresponding conductor did in Fig. 1. The connection from the junction joint 18 of the two diodes is now made to base 27 of the transistor instead of to the grid of the vacuum tube. For the transistor 29 a type CK722 has been successfully employed, this being a junction transistor of the PNP type. All polarities are shown based on this type of transistor. The emitter 31 of the transistor is connected to the positive side as shown and collector 33 is connected to a small relay 35. A small auxiliary relay with 1500 ohms coil and 3 milliamperes pick-up current was found satisfactory. It was found desirable to employ a further auxiliary seal-in or holding relay 41 which serves to relieve the contacts of relay 35 of their current carrying burden after initial actuation. The voltage supply for relay 35 is obtained from a suitable point on voltage divider network 44, 46, 48.

Operation of the transistor version is essentially the same in principle as the vacuum tube version except for minor details. With no A.-C. voltages present, the voltage drop across resistor 48 causes collector current to flow through relay 35 and this current may be adjusted to the proper value by resistors 46 and 48. With A.-C. applied the voltage across resistor 50, which serves as a bleeder resistor, is positive and cuts off the collector current over various portions of the cycle just as in the vacuum tube version. The actual relays 35 and 41 employed for the tripping and sealing or holding function are different from the vacuum tube version because the ratings of the available transistors require a more sensitive relay in the collector circuit. Tripping time and performance are essentially the same as in the vacuum tube version.

It will be apparent that the embodiments shown are only exemplary and that various modifications can be made in construction and arrangement within the scope of my invention as defined in the appended claims.

I claim:

1. In combination with the lines of an alternating current power transmission system, means for deriving a first voltage proportional to the local line voltage, means for deriving a current proportional to the local line current, impedance means having the same impedance characteristics as a predetermined length of the line, circuit means for passing said derived current through said impedance means to produce a second voltage, circuit means for combining said first and second voltages in opposition to produce a difference voltage, vacuum tube relay means having a control grid, means for supplying said difference voltage through a rectifier to said control grid, separate circuit means for deriving said first voltage and supplying it through a separate rectifier to said control grid, and control voltage means for said vacuum tube relay means for preventing actuation thereof except when a predetermined phase relationship exists between said difference voltage and said first voltage.

2. The invention according to claim 1, said vacuum tube relay means comprising a vacuum tube amplifier and auxiliary relay means in the output circuit of said amplifier, and settable control means for said auxiliary relay means for determining the value of current passed by the vacuum tube of said vacuum tube relay means at which said auxiliary relay means operates.

3. In combination with the lines of an alternating current power transmission system, means for deriving a first voltage proportional to the local line voltage, means for deriving a current proportional to the local line current, impedance means having the same characteristic as a predetermined length of line, circuit means for passing said derived current through said impedance means to produce a second voltage, circuit means for combining said first and second voltages in opposition to produce a difference voltage, transistor means having a semi-conducting body, a base electrode, an emitter electrode, and a collector electrode in contact with said body, means for supplying said difference voltage through a rectifier to said base electrode, separate circuit means for deriving said first voltage and supplying it through a separate rectifier to said base electrode, and control voltage means for said transistor relay means for preventing actuation thereof except when a predetermined phase relationship exists between said difference voltage and said first voltage.

4. The invention according to claim 3, said transistor relay means comprising auxiliary relay means, and settable control means for said auxiliary relay means for determining the control potential applied to said transistor at which said auxiliary relay means operates.

5. In combination with the lines of an alternating current power system, means for deriving a first voltage proportional to the local line voltage, means for deriving a current proportional to the local line current, impedance means having the same impedance characteristics as a predetermined length of the line, circuit means for passing said derived current through said impedance means to produce a second voltage, circuit means for combining said first and second voltages in opposition to produce a difference voltage, electronic relay means having a control electrode, means for supplying said difference voltage through a rectifier to said control electrode, separate circuit means for deriving said first voltage and supplying it through a separate rectifier to said control electrode, and control voltage means for said electronic relay means for preventing actuation thereof except when a predetermined phase relationship exists between said difference voltage and said first voltage.

References Cited in the file of this patent

UNITED STATES PATENTS

| | | |
|---|---|---|
| 1,870,518 | Leben | Aug. 9, 1932 |
| 2,201,829 | Heinrich | May 21, 1940 |
| 2,381,375 | Warrington | Aug. 7, 1945 |
| 2,511,680 | Warrington | June 13, 1950 |